United States Patent [19]

Lewis

[11] Patent Number: 5,427,353
[45] Date of Patent: Jun. 27, 1995

[54] DRILLING MUD CIRCULATING PIT CLEAN OUT GATE VALVE

[76] Inventor: Darrell R. Lewis, P.O. Box 141, Maysville, Okla. 73057

[21] Appl. No.: 268,749

[22] Filed: Jun. 30, 1994

[51] Int. Cl.$^6$ .............................................. F16K 3/14
[52] U.S. Cl. ........................................ 251/203; 251/76
[58] Field of Search ................................. 251/76, 203

[56] References Cited

U.S. PATENT DOCUMENTS

| | | | |
|---|---|---|---|
| 853,168 | 5/1907 | Garbe | 251/203 X |
| 863,180 | 8/1907 | Howard | 251/76 |
| 4,247,312 | 1/1981 | Thakue et al. | 55/166 |
| 4,526,687 | 7/1985 | Nugent | 210/202 |
| 4,536,286 | 8/1985 | Nugent | 210/202 |

*Primary Examiner*—John C. Fox
*Attorney, Agent, or Firm*—Robert K. Rhea

[57] ABSTRACT

A drilling mud circulating tank clean out valve is formed by a wedge-shaped valve body having an apertured planar surface secured to the wall of the circulating tank around a cleanout opening adjacent its bottom to form a fluid outlet passageway. A wedge-shaped valve is vertically moveable in the valve body for seating and sealing with a valve seat.

4 Claims, 2 Drawing Sheets

DRILLING MUD CIRCULATING PIT CLEAN OUT GATE VALVE

BACKGROUND OF THE INVENTION

1. Field of the Invention

This invention relates to rotary drilling of oil wells and more particularly to a gate valve for closing a cleanout opening in a wall of a drilling mud circulating pit.

An oil well drilling apparatus circulates drilling mud down the drill pipe and upwardly in the borehole annulus around the drill pipe for the purpose of cooling the drill bit and suspending the formation cuttings in the drilling mud to remove them from the borehole.

At the surface of the earth, the returning drilling mud moved through a shale shaker to remove coarse cuttings is transferred to a circulating pit having compartments to permit the drilling mud flowrate to decrease and allow the heavier solids of the drill cuttings to settle by gravity on the bottom of the drilling fluid circulating pit or settling tank bottom wall.

The lighter drilling mud fluids are removed from the down stream top portion of the circulating tank compartment, opposite the point of entry, by a mud pump and returned to the drill pipe to complete one cycle of drilling mud in a oil well drilling operation.

The drill cuttings settling on the bottom wall of the circulating pit form a viscous sludge and must periodically be cleaned out or removed from the tank which is normally a time consuming and difficult operation which this invention solves or at least facilitates the removal of drill cuttings from the bottom wall of the circulating pit.

2. Description of the Prior Art

Many drilling mud circulating pits are provided with a circular wall opening adjacent the plane of its bottom wall and opened and closed by a cooperating size valve, for example, a four inch (4") diameter opening which is relatively small when compared with the size of the circulating pit and the quantity of drill cuttings needed to be removed therethrough.

U.S. Pat. No. 4,526,687 issued Jul. 2, 1985 and U.S. Pat. No. 4,536,286 issued Aug. 20, 1985 to Nugent for waste water and sludge treatment systems illustrate compartmentalized tanks botch equipped with relatively small four inch diameter (4") drains for cleaning out the bottom portion of the respective tank compartment.

U.S. Pat. No. 4,247,312 issued Jan. 27, 1981 to Thakur et al for DRILLING FLUID CIRCULATING SYSTEM is a further example of the state-of-the-art. This patent discloses a compartmentalized drilling mud circulating pit having a V-shaped bottom wall and a coextensive auger extending longitudinally of the tank and periodically rotated to move drilling mud solids out of the several compartments of the circulating pit.

This invention is distinctive over the above patents by forming a wedge-shaped valve body having a preferably rectangular opening therethrough and is rigidly secured to the outer surface of a circulating pit side wall having a cooperating opening adjacent the bottom wall thereof. The opening in the valve body is closed by a wedge-shaped valve moved vertically for opening and closing the gate valve and circulating pit cleanout opening.

SUMMARY OF THE INVENTION

A vertically open downwardly converging wedge-shaped valve body includes a planar panel provided with an opening of predetermined dimension is adapted to be secured to the outer surface of a circulating pit wall having a cooperating size opening therein. A valve seat surrounds the valve body panel opening on its surface opposite the pit wall.

Open end wedge-shaped sockets at respective lateral sides of a planar valve having guide wedges vertically secured adjacent its respective end portions bias the valve toward the valve body seat when in a valve closed position.

The principal object of this invention is to provide a gate valve for opening and closing a cleanout opening in the wall of a drilling mud circulating pit adjacent its bottom wall for flushing out earth formation cuttings settling out of drilling mud on the circulating pit bottom wall.

DESCRIPTION OF THE PREFERRED EMBODIMENTS

Figure 1:
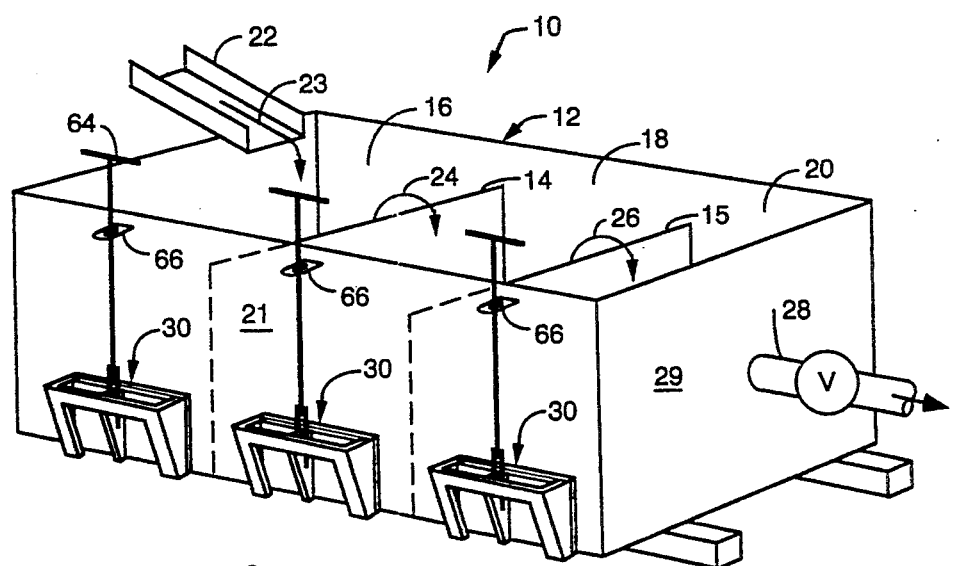
FIG. 1 is a perspective view diagrammatically illustrating a mud circulating pit having a plurality of the valves in closed position connected therewith.
Figure 2:
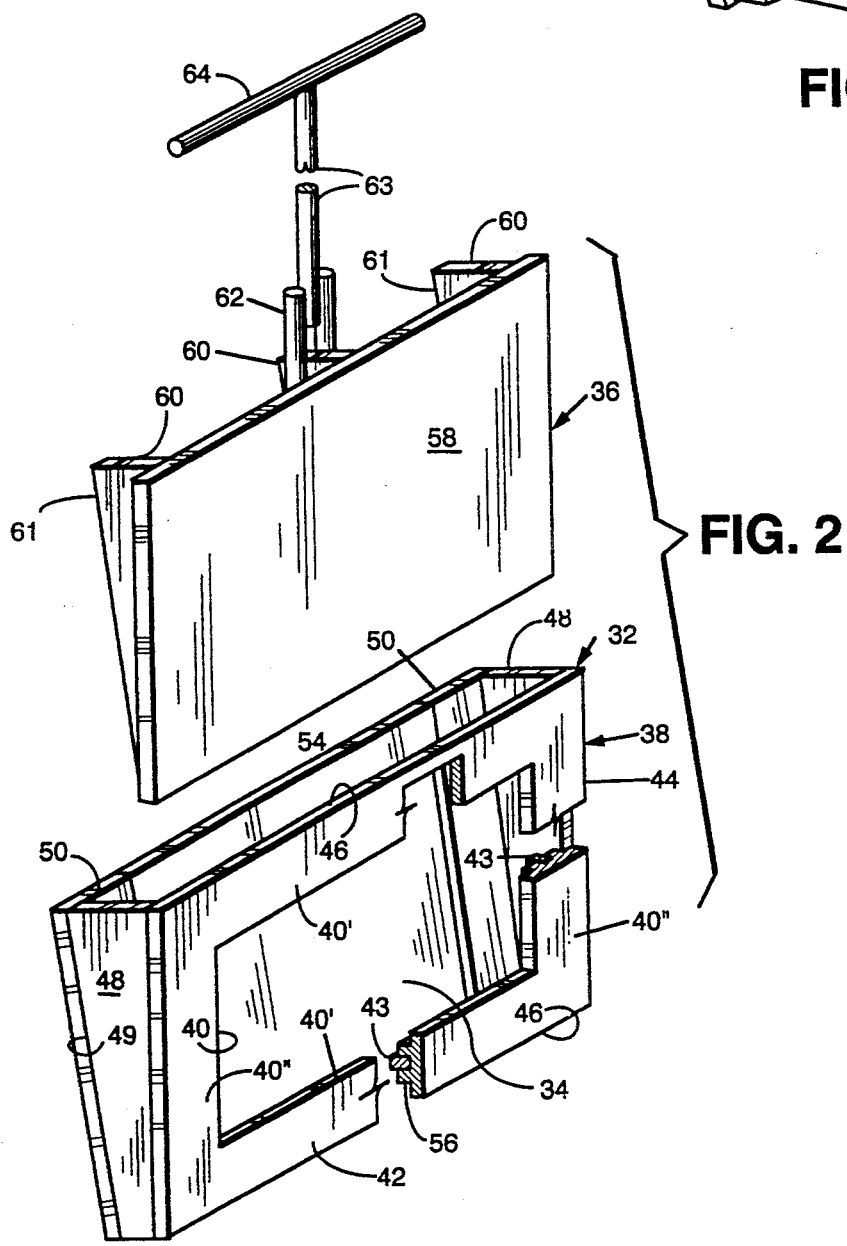
FIG. 2 is a fragmentary exploded front perspective view of the gate valve, per se.

Like characters of reference designate like parts in those figures of the drawings in which they occur.

The reference numeral 10 indicates a drilling mud circulating pit assembly comprising an elongated rectangular upwardly open tank 12 transversely divided by a pair of baffles 14 and 15 of less height than the side walls of the tank for forming three mud pit compartments 16, 18 and 20 in which one side wall 21 of the tank is common to all three compartments.

A drilling mud return chute or trough 22 receives drilling mud from the well borehole, not shown, which empties into the first compartment 16 in the direction of the arrow 23. The drilling mud, not shown, flows into the trough 22 after passing through a shale shaker, not shown, for removing the major portion of the larger drill bit cuttings suspended in the drilling mud. Some of the drill formation cuttings settle out in the compartment 16 as the drilling mud flows across the first baffle 14, in the direction of the arrow 24, into the compartment 18 where the drill cuttings further settle out on the bottom wall of this compartment. The lighter drilling mud and earth cuttings flow over the second baffle 15 into the compartment 20 for a final settling of the earth formation cuttings.

The mud pit assembly 10 further includes an elevated walk and guard rail, not shown, adjacent the top edge perimeter of the tank 12.

A valve equipped pipe 28 connected with the end wall 29 of the tank, opposite the chute 22, conveys drilling mud to the suction intake end of a mud pump, not shown, which circulates the drilling mud back down the borehole, as is conventional.

The above description is presented to explain the circulating pit operation and need for the tank wall gate valve indicated generally at 30.

The gate 30 comprises a valve body 32 having a horizontal fluid passageway 34 which is opened and closed by a manually operated valve 36. The valve body 32 is generally wedge-shaped in end elevation and is formed by a rectangular planar first panel 38 having a central opening 40 of a selected size, for example 10 inches by 18 inches (25.4 cm×45.7 cm), dimensioned to cooperatively mate with a similar size cleanout opening, not shown, in the tank wall 21 communicating with the respective compartment 16, 18 and 20 adjacent the depending limit of the tank wall 21.

The perimeter of the opening 40 and the perimeter of the panel 38 thus defines rectangular horizontal top and bottom and vertical side members 40' and 40", respectively.

The planar surface 42 of the members 40' and 40" contiguously contact the outer surface of the tank wall 21 around the cleanout opening therein and are welded fluid tight along the respective side, bottom and top perimeter edges 44 and 46, respectively, to the outer surface of the tank wall 21 for reasons believed obvious.

A pair of wedge-like right triangular valve body end members 48 are secured by their base edge opposite their hypotenuse 49 to the other planar surface of the panel 38 adjacent its respective side edges 44. A pair of elongated rectangular wedge guides 50, substantially equal in width with the members 40" are secured by one longitudinal edge to the hypotenuse 49 of the respective end wall 48.

An elongated rectangular panel 54 extends between and is rigidly secured at its respective ends, as by welding, to the top portion confronting edge surfaces of the wedge guide panels 50 with its upper edge surface parallel with and in the plane of the upper limit of the upper member 40'. Obviously the members 50 and 54 may be formed unitary and form a second valve body panel, if desired.

Opposite the surface 42, the panel members 40' and 40" are provided with a valve seat 55 comprising an endless groove 56 adjacent the perimeter of the opening 40 for receiving resilient packing 43 and sealing fluid tight with the valve 36 when the latter is inserted into the valve body 32.

The valve 36 comprises a rectangular planar panel 58 having overall dimensions slightly smaller than the valve body panel 38 for vertical sliding movement into and out of the wedge-shaped valve body as will now be explained.

A plurality (3) of similar right triangular wedge-shaped members 60, of slightly smaller perimeter dimensions than the end walls 48, are vertically secured in selected spaced apart relation by their edge opposite their hypotenuse 61 to one planar surface of the valve panel 58.

The central wedge 60 is centrally provided with a vertical through slot 65 for vertically slidably receiving the bight portion 59 of a rod-like U-shaped hammer member 62 connected at its upper limit with the stem 63 of a T-shaped handle 64.

Figures 3, 4, 5:
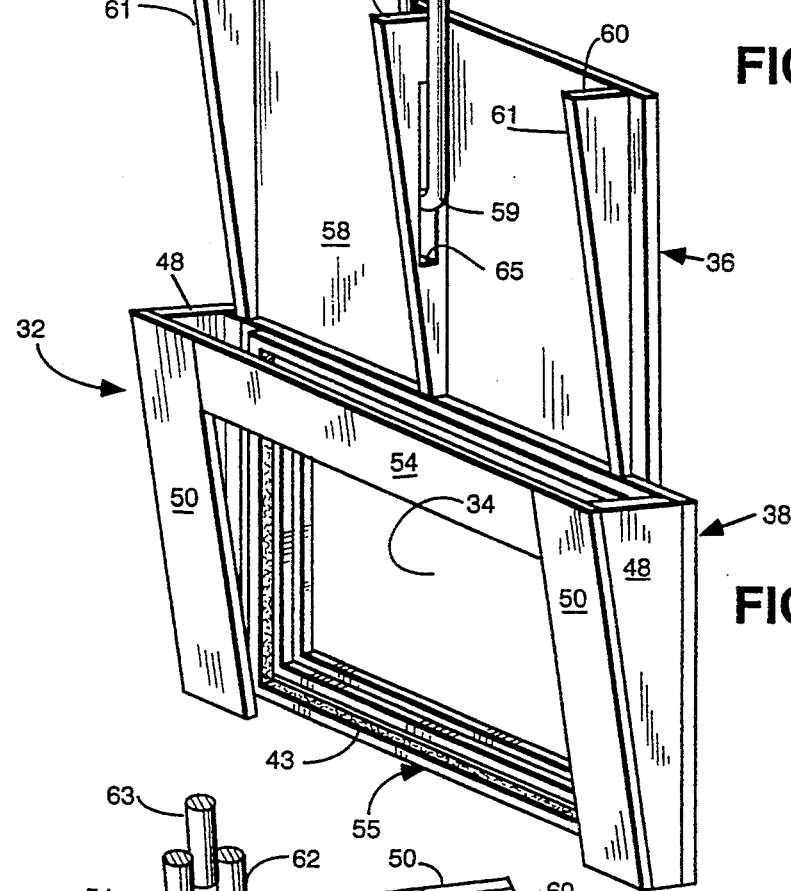
FIG. 3 is a similar fragmentary exploded perspective view of the rearward surfaces of the gate valve and the connection of its handle with the circulating pit wall.
FIG. 4 is a fragmentary perspective view of the gate valve when in closed position; and, FIG. 5 is a vertical cross sectional view, to a larger scale, taken substantially along the line 5—5 of FIG. 3.

A valve support and handle stem guide latch means 66 (FIGS. 3 and 5) is horizontally secured to the tank wall 21 adjacent its upper limit and in substantially vertical alignment with movement of the handle stem 63 in opening and closing the gate valve 30. The stem guide 66 is provided with an elongated opening 68 loosely slidably receiving the handle stem 63.

A right angular stop 70 has one of its legs rigidly secured to the handle stem 63 opposite the tank wall 21 with the other leg of its right angular shape disposed in depending relation and freely received in vertical sliding relation, with the stem, through the opening 68. The depending leg of the stop 70 is dimensioned for entering a stop opening 72 formed in the guide 66 end portion opposite the wall 21 for supporting the valve 36 when in open position.

Operation

In operation, the gate valve 30 is constructed and connected with the tank wall 21 as described hereinabove. In its closed position, the valve 58 is wedged fluid tight against the packing 43 in the groove 56. The handle 64 and stem may be vertically reciprocated in a hammer action of the U-shaped rod 62 on the central wedge 60 to drive the valve 36 into fluid tight engagement with the groove packing. The hypotenuse surface 61 of the wedges 60 bearing against the respective wedge panel 50 ensure a water tight seal. Similarly the hammer action may be utilized to unseat the valve 36 when opening the gate 30.

When the circulating tank 12 is to be cleaned of earth cutting, as for example, when the well has been completed and the tank is to be moved, the valve 36 is lifted out of the valve body and a water hose under high pressure is utilized to liquify the formation cuttings or sludge in the bottom of each tank compartment 16, 18 and 20 and flush the earth cuttings out of the respective compartment into a receptacle for disposal.

Obviously the invention is susceptible to changes or alterations without defeating its practicability. Therefore, I do not wish to be confined to the preferred embodiment shown in the drawings and described herein.

I claim:

1. A gate valve for opening and closing a cleanout opening in a settling tank wall, comprising:
    a vertically open wedge shaped valve body having first and second side walls disposed in downwardly converging relation and having a horizontal opening therethrough for forming a fluid passageway of substantially equal dimension with respect to the tank wall opening and adapted to be secured to said tank wall around its opening;
    a valve seat on said first side wall opposite the tank wall and adjacent the perimeter of its opening;
    valve means including a valve having a planar seat surface vertically moveable into and out of said valve body for seating and unseating on said seat and closing and opening the fluid passageway;
    wedge means including a plurality of triangular shaped wedges secured in spaced relation to said valve opposite its seat surface and cooperatively received by said valve body for biasing said valve means toward the seat,
    one said wedge having a vertical slot; and,
    reciprocable hammer means including a T-shaped handle having a depending stem slidably disposed at its depending end portion within the slot of said one wedge for moving said valve vertically.

2. The gate valve according to claim 1 and further including:
    latch means connected with said tank wall for slidably guiding the stem of said handle during vertical movement of said valve and supporting said valve when in open position.

3. A gate valve for opening and closing a cleanout opening in a settling tank wall, comprising:

a vertically open valve body having first and second side walls disposed and having a horizontal opening therethrough for forming a fluid passageway of substantially equal dimension with respect to the tank wall opening and adapted to be secured to said tank wall around its opening, end walls joining the second side wall to the first side wall in downwardly converging relation;

a valve seat on said first side wall opposite the tank wall and adjacent the perimeter of its opening;

valve means including a valve having a seat surface vertically moveable into and out of said valve body for seating and unseating on said seat;

wedge means including a plurality of wedges secured in spaced relation to said valve opposite its seat surface and cooperatively received by said valve body for biasing said valve means toward the seat;

one said wedge having a vertical slot; and, reciprocable hammer means including a handle having a depending stem portion slidably disposed within the slot of said one wedge and connected with said one wedge for moving said valve vertically.

4. The gate valve according to claim 3 and further including:

latch means connected with said tank wall for slidably guiding the stem of said handle during vertical movement of said valve and supporting said valve when in open position.

* * * * *